United States Patent
Wei et al.

(10) Patent No.: US 10,818,465 B2
(45) Date of Patent: Oct. 27, 2020

(54) METHOD FOR MAKING FIELD EMITTER

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 49 days.

(21) Appl. No.: 16/393,282

(22) Filed: Apr. 24, 2019

(65) Prior Publication Data
US 2020/0144014 A1    May 7, 2020

(30) Foreign Application Priority Data
Nov. 1, 2018  (CN) .......................... 2018 1 1298852

(51) Int. Cl.
| | | |
|---|---|---|
| *H01J 9/18* | (2006.01) | |
| *C09J 5/04* | (2006.01) | |
| *C09J 201/00* | (2006.01) | |
| *C09J 5/02* | (2006.01) | |

(52) U.S. Cl.
CPC . *H01J 9/18* (2013.01); *C09J 5/02* (2013.01); *C09J 5/04* (2013.01); *C09J 201/00* (2013.01); *C09J 2203/326* (2013.01)

(58) Field of Classification Search
USPC ................................................. 156/247, 249
See application file for complete search history.

(56) References Cited

U.S. PATENT DOCUMENTS

| | | | | |
|---|---|---|---|---|
| 9,862,170 B2* | 1/2018 | Wei | ....................... | B32B 37/025 |
| 2006/0079012 A1* | 4/2006 | Jeong | ...................... | H01J 9/025 |
| | | | | 438/20 |
| 2009/0237886 A1 | 9/2009 | Iwai et al. | | |
| 2009/0266477 A1* | 10/2009 | Weisenberger | ....... | B32B 37/203 |
| | | | | 156/185 |

(Continued)

FOREIGN PATENT DOCUMENTS

| | | |
|---|---|---|
| CN | 102050424 | 5/2011 |
| DE | 102010027871 | 10/2011 |

(Continued)

OTHER PUBLICATIONS

Bradford, Philip David, Advanced Materials Based on Carbon Nanotube Arrays, Yarns and Papers, PhD thesis, Apr. 20, 2010.

*Primary Examiner* — Sing P Chan
(74) *Attorney, Agent, or Firm* — ScienBiziP, P.C.

(57) ABSTRACT

A method for making field emitter is provided. A carbon nanotube array and a cathode substrate are provided. A pressure is applied on the carbon nanotube array to make the carbon nanotubes of the carbon nanotube array toppled over and form a carbon nanotube paper. An adhesive tape is placed on the carbon nanotube paper, and then the adhesive tape is peeled off to make the carbon nanotube paper bonded to the adhesive tape. The cathode substrate is placed on the carbon nanotube paper; and then the cathode substrate is peeled off, at least part of the plurality of carbon nanotubes are bonded to the cathode substrate and perpendicular to the cathode substrate.

19 Claims, 6 Drawing Sheets

(56) References Cited

U.S. PATENT DOCUMENTS

| | | | |
|---|---|---|---|
| 2011/0109006 A1 | 5/2011 | Zheng et al. | |
| 2015/0266737 A1* | 9/2015 | Wei | C01B 32/168 264/164 |
| 2015/0274518 A1* | 10/2015 | Wei | C01B 32/168 156/80 |
| 2015/0274519 A1* | 10/2015 | Wei | B82Y 40/00 156/80 |
| 2015/0274520 A1* | 10/2015 | Wei | C01B 32/168 156/230 |
| 2015/0291418 A1* | 10/2015 | Wei | C01B 32/168 264/400 |
| 2015/0291419 A1* | 10/2015 | Wei | C01B 32/164 264/28 |
| 2015/0291426 A1* | 10/2015 | Wei | C01B 32/168 264/400 |
| 2015/0291427 A1* | 10/2015 | Wei | C01B 32/168 423/447.1 |
| 2015/0291428 A1* | 10/2015 | Wei | C01B 32/168 156/249 |
| 2015/0360948 A1* | 12/2015 | Wei | B32B 7/12 264/164 |
| 2015/0360949 A1* | 12/2015 | Wei | B29C 65/002 264/28 |
| 2015/0367557 A1* | 12/2015 | Wei | B29C 59/022 428/195.1 |
| 2015/0368105 A1* | 12/2015 | Wei | B32B 37/025 156/80 |
| 2016/0159651 A1 | 6/2016 | Wei et al. | |
| 2018/0354802 A1* | 12/2018 | Liu | B82B 3/0004 |
| 2020/0140278 A1* | 5/2020 | Wei | C01B 32/168 |
| 2020/0141062 A1* | 5/2020 | Wang | D21H 13/50 |
| 2020/0141808 A1* | 5/2020 | Wang | G01J 5/023 |
| 2020/0144014 A1* | 5/2020 | Wei | H01J 9/18 |

FOREIGN PATENT DOCUMENTS

| | | |
|---|---|---|
| TW | 200951210 | 12/2009 |
| TW | 201625481 | 7/2016 |

* cited by examiner

METHOD FOR MAKING FIELD EMITTER

CROSS-REFERENCE TO RELATED APPLICATIONS

This application claims all benefits accruing under 35 U.S.C. § 119 from China Patent Application No. 201811298852.8, filed on Nov. 1, 2018, in the China National Intellectual Property Administration, the contents of which are hereby incorporated by reference. The application is also related to copending applications entitled, "METHOD FOR MAKING BLACKBODY RADIATION SOURCE", filed Apr. 12, 2019 Ser. No. 16/382,408. The application is related to copending applications entitled, "METHOD FOR TRANSFERRING CARBON NANOTUBE ARRAY", filed Apr. 17, 2019 Ser. No. 16/387,158. The application is also related to copending applications entitled, "METHOD FOR REPAIRING SURFACE OF CARBON NANOTUBE ARRAY", filed Apr. 12, 2019 Ser. No. 16/382,413.

FIELD

The present disclosure relates to a method for making a field emitter.

BACKGROUND

Carbon nanotubes (CNTs) are an allotrope of carbon with a cylindrical nanostructure. CNTs exhibit extraordinary strength and unique electrical properties, and are efficient conductors of heat. Carbon nanotube array is formed by a plurality of carbon nanotubes growing in perpendicular with a substrate, and the carbon nanotube array can exert excellent electrical conduction and heat conduction in an axial direction of the carbon nanotube. The carbon nanotube array can be applied to field emitters.

Conventional methods for making carbon nanotube field emission are usually carried out by bonding a carbon nanotube array grown on a substrate onto a cathode substrate thereby a root of the carbon nanotube array is used as an emitting end of the carbon nanotube field emitter. However, the carbon nanotube array can be easily damaged during bonding the carbon nanotube array onto the cathode substrate. For example, the carbon nanotubes of the carbon nanotube array may be tilted, bent, or become entangled; and resulting a morphology of carbon nanotubes on the surface of the cathode substrate being messy, and a poor emissivity and complicated operations of the field emitter.

Therefore, there is a room for improvement.

BRIEF DESCRIPTION OF THE DRAWINGS

Implementations of the present technology will now be described, by way of embodiment, with reference to the attached figures, wherein.

DETAILED DESCRIPTION

Figure 1:
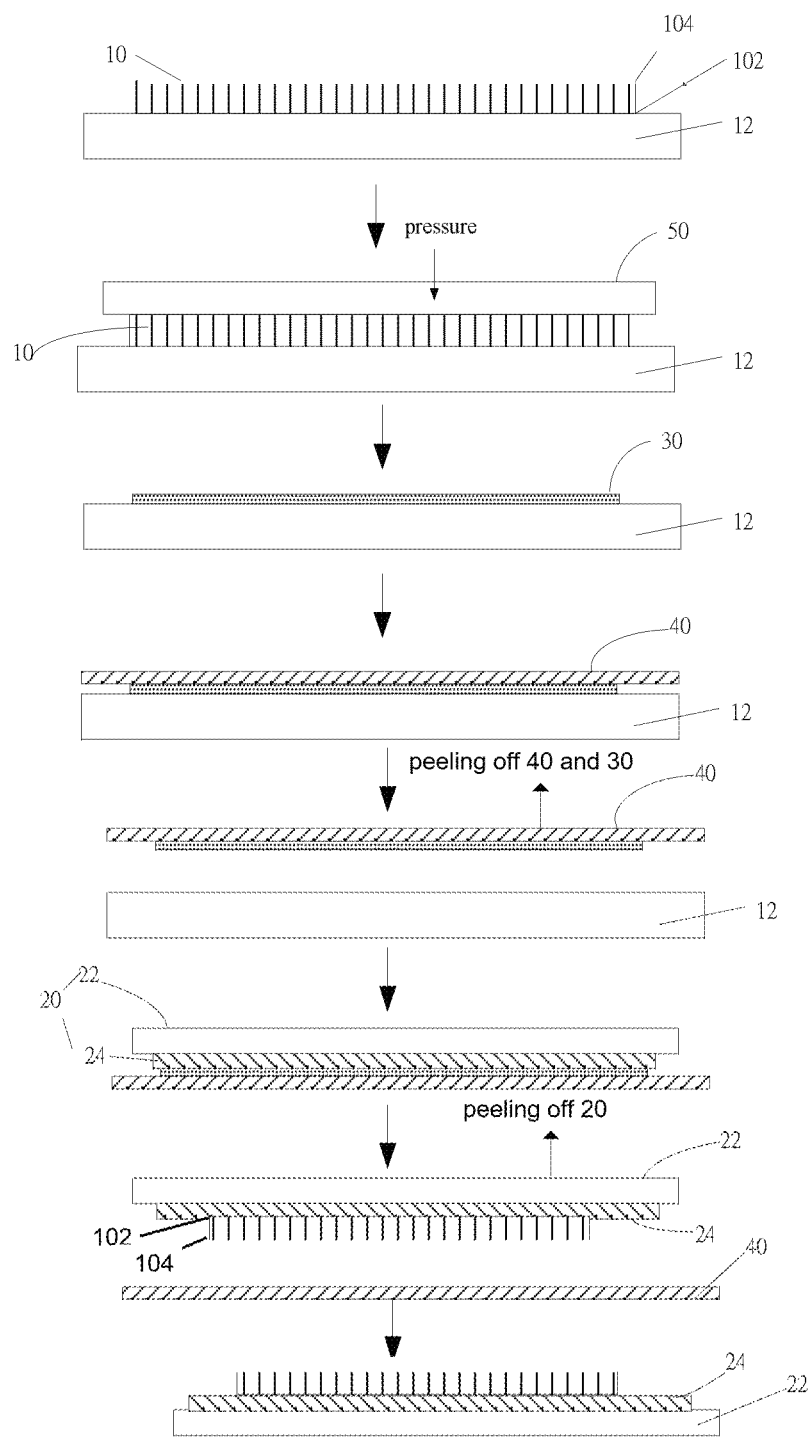
FIG. 1 is a process diagram of one embodiment of a method for making field emitter.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proends of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
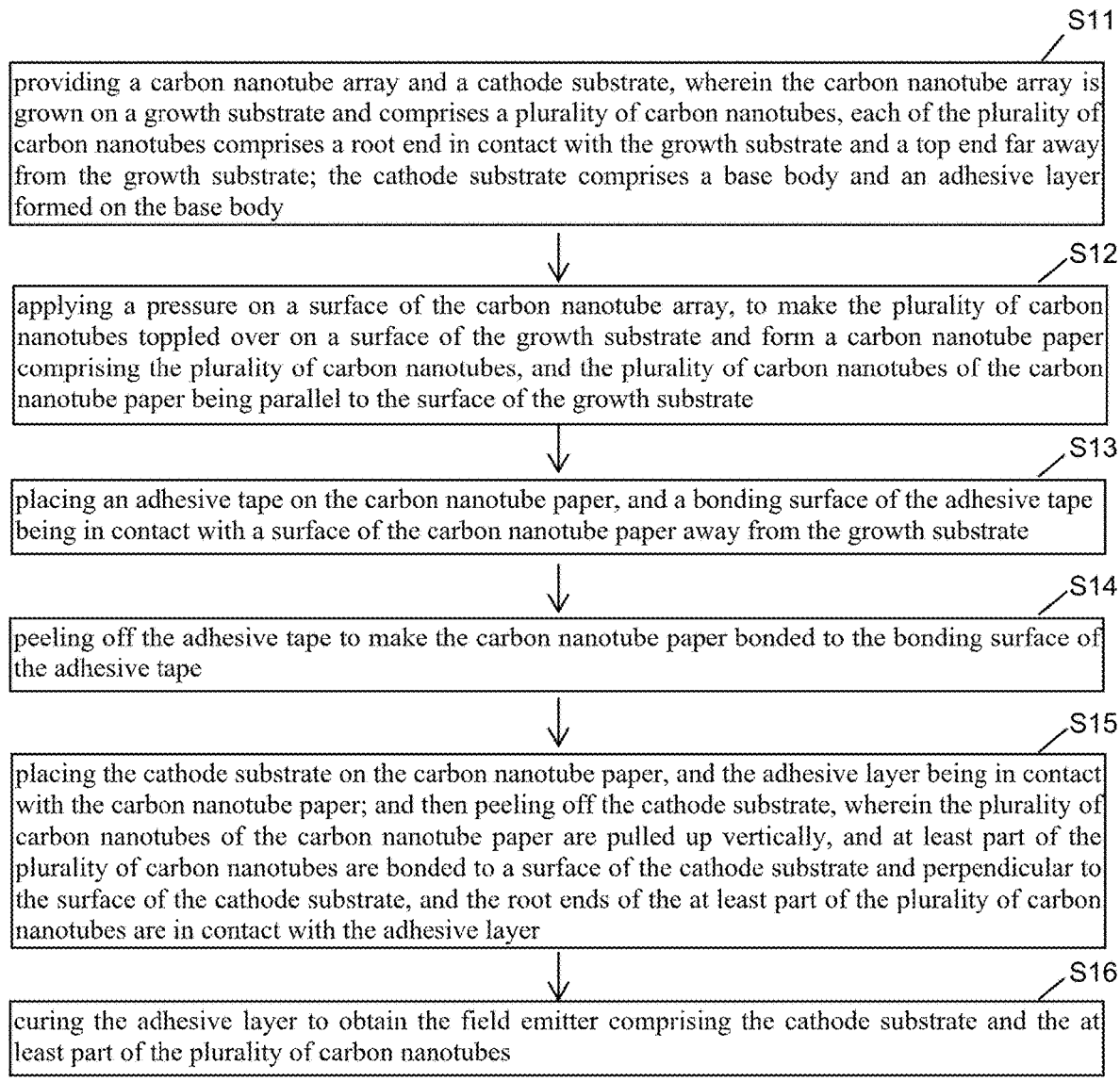
FIG. 2 is a flow diagram of the method for making the field emitter in FIG. 1.

FIG. 1 and FIG. 2 illustrate a method for making field emitter of one embodiment. The method for making field emitter comprises:

step (S11), providing a carbon nanotube array 10 and a cathode substrate 20, wherein the carbon nanotube array 10 is grown on a growth substrate 12 and comprises a plurality of carbon nanotubes, each of the plurality of carbon nanotubes comprises a root end 102 in contact with the growth substrate 12 and a top end 104 away from the growth substrate 12; the cathode substrate 20 comprises a base body 22 and an adhesive layer 24 formed on the base body 22;

step (S12), applying a pressure on a surface of the carbon nanotube array 10, to make the plurality of carbon nanotubes toppled over on a surface of the growth substrate 12 and form a carbon nanotube paper 30 comprising the plurality of carbon nanotubes, and the extending directions of the plurality of carbon nanotubes of the carbon nanotube paper 30 being parallel to the surface of the growth substrate 12;

step (S13), placing an adhesive tape 40 on the carbon nanotube paper 30, and a bonding surface of the adhesive tape 40 being in contact with a surface of the carbon nanotube paper 30 away from the growth substrate 12;

step (S14), peeling off the adhesive tape 40 with the carbon nanotube paper 30 from the growth substrate 12 and make the carbon nanotube paper 30 bonded to the bonding surface of the adhesive tape 40;

step (S15), placing the cathode substrate 20 on the carbon nanotube paper 30, and the adhesive layer 24 being in contact with the carbon nanotube paper 30; and then peeling off the cathode substrate 20, wherein the plurality of carbon nanotubes of the carbon nanotube paper 30 are pulled up vertically, and at least part of the plurality of carbon nanotubes are bonded to a surface of the cathode substrate 20 and perpendicular to the surface of the cathode substrate 20, and the top ends 104 of the at least part of the plurality of carbon nanotubes are in contact with the adhesive layer 24; and step (S16), curing the adhesive layer 24 to obtain the field emitter comprising the cathode substrate 20 and the at least part of the plurality of carbon nanotubes.

In step (S11), the carbon nanotube array 30 is a super-aligned carbon nanotube array. The carbon nanotubes of the super-aligned carbon nanotube array are substantially parallel to each other and perpendicular to the surface of the growth substrate 12. The carbon nanotubes of the super-aligned carbon nanotube array are joined with each other by Van der Waals forces to form an array. The super-aligned carbon nanotube array may comprise a minority of randomly arranged carbon nanotubes; however, the amount of randomly arranged carbon nanotubes is small and does not affect the overall directional properties of the carbon nanotubes in the super-aligned carbon nanotube array. The super-aligned carbon nanotube array is pure, referring that the super-aligned carbon nanotube array is free with impurities, such as amorphous carbon, residual catalyst metal particles or the like.

A method for making the super-aligned carbon nanotube array can be a chemical vapor deposition (CVD) method, an arc discharge preparation method, or an aerosol preparation method. In one embodiment, the super-aligned carbon nanotube array is directly grown on the growth substrate 12 by the chemical vapor deposition (CVD) method. The chemical vapor deposition (CVD) method comprises the steps of (a) forming a catalyst layer on a surface of the growth substrate 12, in which a material of the catalyst layer can be selected from the group consisting of iron (Fe), cobalt (Co), nickel (Ni) and alloy of any combination thereof. Step (b) is annealing the growth substrate 12 with the catalyst layer in air at 700° C. to 900° C. for about 30 minutes to 90 minutes and (c) disposing the growth substrate 12 in a reaction chamber. The reaction chamber is heated in protective gas to 500° C.~740° C., and a carbon source gas is introduced into the reaction chamber for about 5 minutes to about 30 minutes. The super-aligned carbon nanotube array is grown from the growth substrate 12. A height of the carbon nanotube of the super-aligned carbon nanotube array is ranged from about 200 micrometers to about 650 micrometers. The carbon source gas can be chemically active hydrocarbons, such as acetylene. The protective gas can be nitrogen, ammonia, or an inert gas. Examples of the method for making the super-aligned carbon nanotube array are taught by U.S. Pat. No. 7,045,108 to Jiang et al.

The surface of the growth substrate 12 is flat and smooth. A material of the growth substrate 12 can be P-type silicon, N-type silicon, silicon oxide with an oxide layer or quartz with an oxide layer. In one embodiment, the growth substrate 12 is a silicon wafer.

The base body 22 can be made of an insulating material, such as ceramic, glass, silicon oxide (SiOx); or an electrically conductive material, such as metal, silicon, or glass with conductive layer coated thereon. The adhesive layer 24 can be made of an electrically conductive material, such as a silver paste; or an insulating material. When the base body 22 is an insulating material, the adhesive layer 24 is made of a conductive material to make the at least part of the carbon nanotubes electrical contacted with the cathode substrate 20. When the base body 22 is a conductive material, the adhesive layer 24 can be made of a conductive material or an insulating material, as long as the at least part of the carbon nanotubes are in electrical contact with the cathode substrate 20. The formation of the adhesive layer 24 on the base body 22 can be carried out by way of a screen-printing method or a coating method (e.g. spin coating). In one embodiment, the base body 22 is a copper foil, and the adhesive layer 24 is made of silver paste.

The carbon nanotube array 10 comprises a top surface and an end surface, the end surface is located on the surface of the substrate 12, and the plurality of carbon nanotubes are oriented from the end surface to the top surface. The end surface is formed by the root ends 102 of the plurality of carbon nanotubes of the carbon nanotube array 10. The top surface is formed by the top ends 104 of the plurality of carbon nanotubes of the carbon nanotube array 10.

In step (S12), applying the pressure on the top surface of the carbon nanotube array 10 by a pressure providing device 50. The pressure providing device can be a roller or a plate but not limited to them. When the pressure providing device 50 is the roller, the roller can roll counterclockwise or clockwise on the top surface. When the pressure providing device 50 is the plate, an angle between a direction of applying the pressure and the top surface is from 0 degree to about 90 degrees. In one embodiment, the angle between the direction of applying the pressure and the top surface is greater than or equal to 30 degrees and less than or equal to 60 degrees. The surface of the plate or roller in contact with the carbon nanotube array 30 is a flat surface and is not sticky. A material of the plate or roller is not limited. The material of the plate or roller can be metal such as steel and iron. The material of the plate or roller can also be non-metal such as glass, silicon plate, and diamond. In one embodiment, applying the pressure to the surface of the carbon nanotube array 30 by a glass plate, and the angle between the direction of applying the pressure and the top surface is about 45 degrees.

If the pressure applied to the surface of the carbon nanotube array 10 is too large, the plurality of carbon nanotubes of the carbon nanotube array 10 are easily damaged; if the pressure applied to the surface of the carbon nanotube array 10 is too small, the carbon nanotube paper 30 can not be formed. In one embodiment, the pressure applied to the surface of the carbon nanotube array 10 is about 20 Newton.

Figure 3:
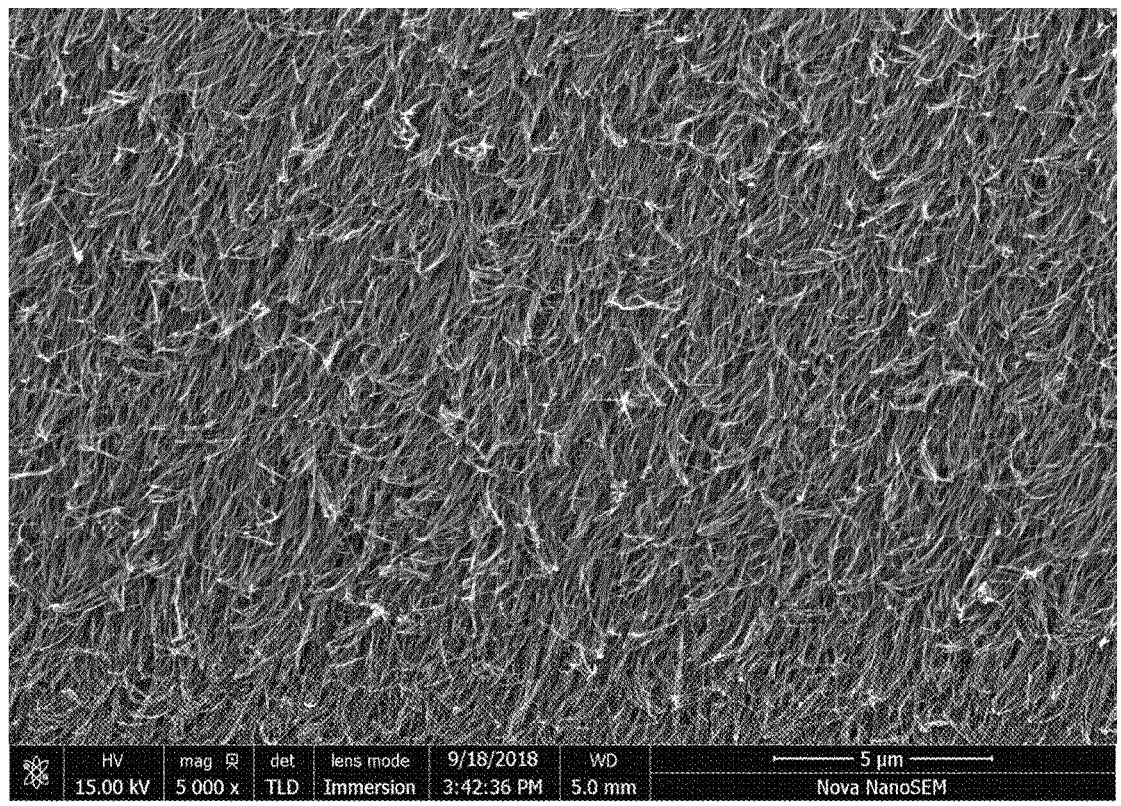
FIG. 3 is a scanning electron microscope (SEM) image of a carbon nanotube paper of one embodiment.

In one embodiment, the pressure providing device 50 applies pressure to the carbon nanotube array 10 in one direction, and the plurality of carbon nanotubes of the carbon nanotube array 10 are toppled over in one direction, therefore, the plurality of carbon nanotubes of the carbon nanotube paper 30 are aligned in the same direction. It is advantageous to vertically bond the plurality of carbon nanotubes of the carbon nanotube paper 30 on the adhesive layer 24 in a subsequent step. FIG. 3 shows an electron micrograph of one embodiment of the carbon nanotube paper 30.

In step (S13), after the adhesive tape 40 is placed on the surface of the carbon nanotube paper 30, the adhesive tape 40 can be further pressed to better bond one end of the plurality of carbon nanotubes in the carbon nanotube paper 30 to the adhesive tape 40.

In step (S14), the bonding force between the plurality of carbon nanotubes of the carbon nanotube paper 30 and the growth substrate 12 is weak, and the bonding force between the plurality of carbon nanotubes of the carbon nanotube paper 30 and the growth substrate 12 is much smaller than the bonding force between the plurality of carbon nanotubes of the carbon nanotube paper 30 and the adhesive tape 40.

During peeling off the adhesive tape 40, the bonding force is insufficient to bond one end of the plurality of carbon nanotubes of the carbon nanotube paper 30 to the growth substrate 12, and the carbon nanotube paper 30 will be entirely separated from the growth substrate 12 and transferred to the surface of the adhesive tape 40. A bonding force between the root ends 102 of the plurality of carbon nanotubes and the adhesive tape 40 is less than a bonding force between the top ends 104 of the plurality of carbon nanotubes and the adhesive tape 40.

In step (S15), the bonding force between the root ends 102 of the plurality of carbon nanotubes and the adhesive tape 40 is less than the bonding force between the top ends 104 of the plurality of carbon nanotubes and the adhesive tape 40. Therefore, during peeling off the cathode substrate 20, the plurality of carbon nanotubes of the carbon nanotube paper 30 are first pulled up vertically under the binding force between the adhesive tape 40 and the plurality of carbon nanotubes and the binding force between the cathode substrate 20 and the plurality of carbon nanotubes. The root ends 102 of the plurality of carbon nanotubes is bonded to the adhesive layer 24, and the top ends 104 of the plurality of carbon nanotubes is bonded to the adhesive tape 40. The bonding force between the root ends 102 of the plurality of carbon nanotubes and the adhesive layer 24 is greater than the bonding force between the top ends 104 of the plurality of carbon nanotubes and the adhesive tape 40. Therefore, after peeling off the cathode substrate 20, at least part of the plurality of carbon nanotubes are separate from the adhesive tape 40 and bonded to the surface of the cathode substrate 20, and the at least part of the plurality of carbon nanotubes are in contact with the adhesive layer 24.

In one embodiment, during peeling off the cathode substrate 20, a peeling direction of the cathode substrate 20 is perpendicular to the surface of the cathode substrate 20, and the plurality of carbon nanotubes of the carbon nanotube paper 30 are simultaneously pulled up vertically, and at least part of the plurality of carbon nanotubes are separate from the adhesive tape 40 and bonded to the surface of the cathode substrate 20, and the root ends 102 of the plurality of carbon nanotubes are contacted with the adhesive layer 24.

In step (S16), curing the adhesive layer 24 can be carried out by sintering in a curing device. A sintering temperature is selected according to a type of binder in the adhesive layer 24. After curing the adhesive layer 24, the bonding force between the adhesive layer 24 and the at least part of the plurality of carbon nanotubes is strong, and the at least part of the plurality of carbon nanotubes are electrically contacted with the cathode substrate 20.

In one embodiment, further comprises annealing the carbon nanotube array 10 before step (S12) and after step (S11). Annealing the carbon nanotube array 10 and the growth substrate 12 can weaken the binding force between the carbon nanotubes in the carbon nanotube array 10 and the growth substrate 12; therefore, during peeling off the adhesive tape 40, the carbon nanotube paper 30 is easily bonded to the adhesive tape 40. In one embodiment, annealing the carbon nanotube array 10 and the growth substrate 12 in oxygen for about 9 minutes, a pressure of the oxygen is about 10 torr, and an annealing temperature is about 650° C.

In one embodiment, further comprises plasma treating the root ends 102 of the at least part of the plurality of carbon nanotubes after step (S16), to remove impurities on the at least part of the plurality of carbon nanotubes.

Figure 4:
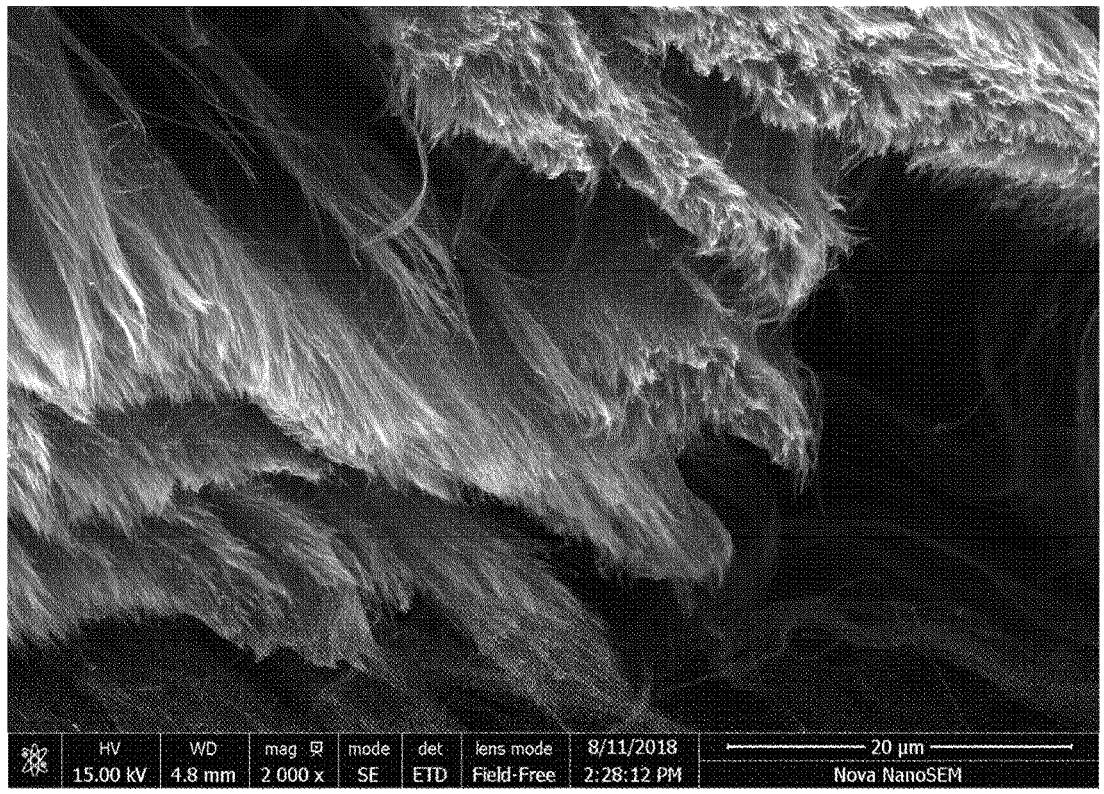
FIG. 4 shows a scanning electron microscope (SEM) image of the field emitter obtained by the method for making field emitter as disclosed in FIG. 1 and FIG. 2.

FIG. 4 shows a scanning electron microscope (SEM) image of the field emitter obtained by the method for making field emitter shown as in FIG. 1 and FIG. 2. It can be seen that the carbon nanotubes are substantially perpendicular to the surface of the adhesive layer. It can also be seen that the top ends of the carbon nanotubes has many burrs, and the burrs can reduce a surface area of the tip, resulting a local electric field of the field emitter being concentrated and the field emitter having high field emission efficiency.

Figure 5:
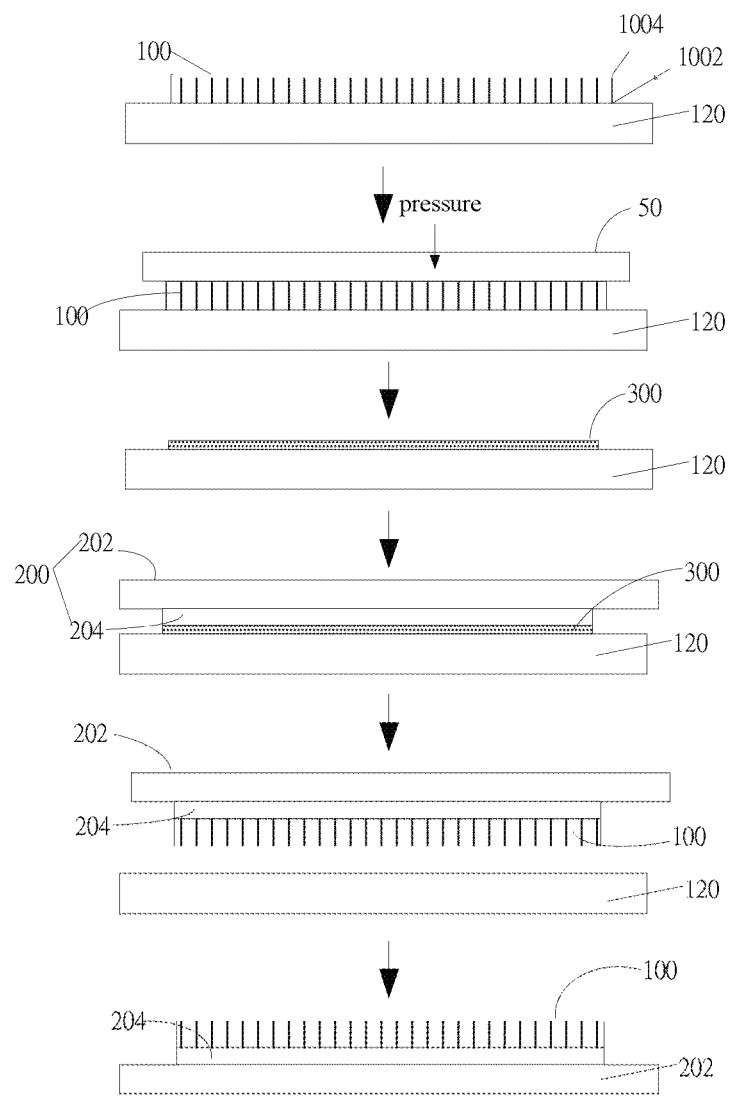
FIG. 5 is a process diagram of one embodiment of a method for making field emitter.
Figure 6:
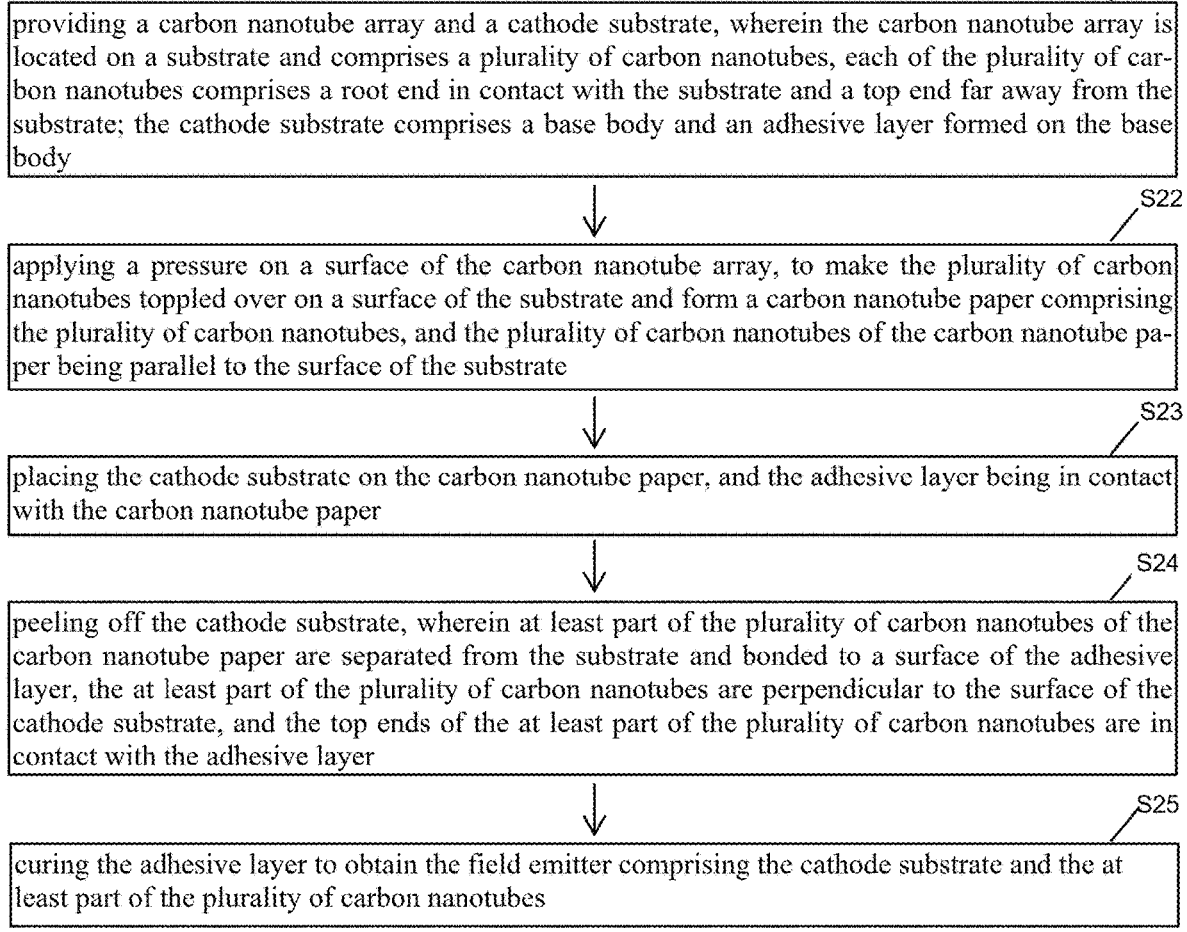
FIG. 6 is a flow diagram of the method for making field emitter in FIG. 5.

FIG. 5 and FIG. 6 illustrate a method for making field emitter of one embodiment. The method for making field emitter comprises:

step (S21), providing a carbon nanotube array 100 and a cathode substrate 200, wherein the carbon nanotube array 100 is located on a substrate 120 and comprises a plurality of carbon nanotubes, each of the plurality of carbon nanotubes comprises a root end 1002 in contact with the substrate 120 and a top end 1004 far away from the substrate 120; the cathode substrate 200 comprises a base body 202 and an adhesive layer 204 formed on the base body 202;

step (S22), applying a pressure on a surface of the carbon nanotube array 100, to make the plurality of carbon nanotubes toppled over on the surface of the substrate 120 and form a carbon nanotube paper 300 comprising the plurality of carbon nanotubes, and the plurality of carbon nanotubes of the carbon nanotube paper 300 being parallel to the surface of the substrate 120;

step (S23), placing the cathode substrate 200 on the carbon nanotube paper 300, and the adhesive layer 204 being in contact with the carbon nanotube paper 300;

step (S24), peeling off the cathode substrate 200, wherein at least part of the plurality of carbon nanotubes of the carbon nanotube paper 300 are separated from the substrate 120 and bonded to a surface of the adhesive layer 204, the at least part of the plurality of carbon nanotubes are perpendicular to the surface of the cathode substrate 200, and the top ends 1004 of the at least part of the plurality of carbon nanotubes are in contact with the adhesive layer 204;

and step (S25), curing the adhesive layer 204 to obtain the field emitter comprising the cathode substrate 200 and the at least part of the plurality of carbon nanotubes.

In step (S21), the carbon nanotube array 100 can be fixed on the substrate 120 by an adhesive, and a bonding force between the root ends 1002 of the plurality of carbon nanotubes of the carbon nanotube array 100 and the adhesive is less than a bonding force between the top ends 1004 of the plurality of carbon nanotubes of the carbon nanotube array 100 and the adhesive. The surface of the substrate 120 is flat and smooth. A material of the substrate 120 can be flexible or rigid. For example, the material of the substrate 120 can be tape, metal, glass, plastic, silicon wafer, silicon dioxide sheet, quartz sheet, polymethyl methacrylate (PMMA), or polyethylene terephthalate (PET). In one embodiment, the substrate 120 is a silicon wafer, and the carbon nanotube array 100 is fixed on the silicon wafer by the adhesive.

The carbon nanotube array 100 is the same as the carbon nanotube array 10, the cathode substrate 200 is the same as the cathode substrate 20, step (S22) is the same as step (S12), and step (S23) is the same as step (S13).

In step (S24), a bonding force between the top ends 1004 of the plurality of carbon nanotubes of the carbon nanotubes array 100 and the adhesive layer 204 is greater than a bonding force between the root ends 1002 of the plurality of carbon nanotubes of the carbon nanotube array 100 and the adhesive layer 204. Therefore, after peeling off the cathode substrate 200, the plurality of carbon nanotubes of the carbon nanotube paper 300 are pulled up vertically, the top ends 1004 of the plurality of carbon nanotubes are bonded to the adhesive layer 204, and the root ends 1002 of the plurality of carbon nanotubes are bonded to the substrate 120. The bonding force between the top ends 1004 of the plurality of carbon nanotubes and the adhesive layer 204 is greater than the bonding force between the root ends 1002 of the plurality of carbon nanotubes and the substrate 120. Therefore, after peeling off the cathode substrate 20, at least part of the plurality of carbon nanotubes are separate from the substrate 120 and bonded to the surface of the cathode substrate 200, and the at least part of the plurality of carbon nanotubes are in contact with the adhesive layer 204.

In one embodiment, during peeling off the cathode substrate 200, a peeling direction of the cathode substrate 200 is perpendicular to the surface of the substrate 120, and the plurality of carbon nanotubes of the carbon nanotube paper 300 are simultaneously pulled up vertically, and the plurality of carbon nanotubes are separated from the substrate 120 and inverted bonded to the surface of the adhesive layer 204. In one embodiment, during peeling off the cathode substrate 200, the plurality of carbon nanotubes of the carbon nanotube paper 300 are simultaneously separated from the substrate 120 and inverted bonded to the surface of the adhesive layer 204.

Step (S25) is the same as step (S16).

In one embodiment, further comprises annealing the carbon nanotube array 100 before step (S22) and after step (S21). Annealing the carbon nanotube array 100 and the substrate 120 can weaken the binding force between the carbon nanotubes of the carbon nanotube array 100 and the substrate 120; therefore, during peeling off the cathode substrate 200, the plurality of carbon nanotube of the carbon nanotube paper 300 is easily bonded to the adhesive layer 204. In one embodiment, annealing the carbon nanotube array 100 and the substrate 120 in oxygen for about 9 minutes, a pressure of the oxygen is about 10 torr, and an annealing temperature is about 650° C.

In one embodiment, further comprises plasma treating the root ends 1002 of the at least part of the plurality of carbon nanotubes after step (S25), to remove impurities on the at least part of the plurality of carbon nanotubes.

The method for making field emitter has many advantages. First, the method first presses the carbon nanotube array into the carbon nanotube paper and then bonds it by a cathode substrate. Since the carbon nanotube paper has high mechanical strength and is not easily damaged, the carbon nanotubes will not be tilted, bent, and entangled together during bonding the carbon nanotube paper, thereby improving the emission efficiency of the field emitter. Second, the root ends of the carbon nanotubes at the electron-emitting end of the field emitter are located on the same plane, thereby improving the uniformity of the field emission. Third, the root ends of the carbon nanotubes have many burrs, and the burrs can reduce a surface area of the tip, resulting a local electric field of the field emitter being concentrated and the field emitter having high field emission efficiency. Fourth, the substrate, the carbon nanotube paper and the cathode substrate are stacked to form a multilayer structure, the multilayer structure can avoid the carbon nanotube paper being crushed and bumped during transportation. Fifth, the method is simple in operation and low in cost.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making field emitter comprising:
   step (S11), providing a carbon nanotube array and a cathode substrate, wherein the carbon nanotube array is grown on a growth substrate and comprises a plurality of carbon nanotubes, each of the plurality of carbon nanotubes comprises a root end in contact with the growth substrate and a top end away from the growth substrate; the cathode substrate comprises a base body and an adhesive layer formed on the base body;
   step (S12), pressing the carbon nanotube array to make the plurality of carbon nanotubes toppled over on a surface of the growth substrate and form a carbon nanotube paper comprising the plurality of carbon nanotubes, wherein extending directions of the plurality of carbon nanotubes of the carbon nanotube paper become parallel to the surface of the growth substrate after pressing;
   step (S13), placing an adhesive tape on the carbon nanotube paper, and the adhesive tape being in contact with a surface of the carbon nanotube paper away from the growth substrate;
   step (S14), peeling off the adhesive tape with the carbon nanotube paper from the growth substrate to make the carbon nanotube paper bonded to the adhesive tape;
   step (S15), placing the cathode substrate on the carbon nanotube paper, and the adhesive layer being in contact with the carbon nanotube paper; and then peeling off the cathode substrate, wherein the plurality of carbon nanotubes of the carbon nanotube paper are pulled up vertically, and at least part of the plurality of carbon nanotubes are bonded to a surface of the cathode substrate and perpendicular to the surface of the cathode substrate, and the root ends of the at least part of the plurality of carbon nanotubes are in contact with the adhesive layer; and
   step (S16), curing the adhesive layer.

2. The method of claim 1, wherein the carbon nanotube array is a super-aligned carbon nanotube array, and the plurality of carbon nanotubes of the carbon nanotube array are substantially parallel to each other and perpendicular to the surface of the growth substrate.

3. The method of claim 1, pressing the carbon nanotube array by a roller, wherein the roller rolls counterclockwise or clockwise on the surface of the carbon nanotube array.

4. The method of claim 1, pressing the carbon nanotube array by a plate, wherein an angle between a direction of pressing the carbon nanotube array and the surface of the carbon nanotube array ranges from about 30 degrees to about 60 degrees.

5. The method of claim 1, pressing the carbon nanotube array in one direction, wherein the plurality of carbon nanotubes of the carbon nanotube array are toppled over in one direction, and the plurality of carbon nanotubes of the carbon nanotube paper are aligned in the same direction.

6. The method of claim 1, wherein a bonding force between the root ends of the plurality of carbon nanotubes and the adhesive tape is less than a bonding force between the top ends of the plurality of carbon nanotubes and the adhesive tape.

7. The method of claim 6, wherein a bonding force between the root ends of the plurality of carbon nanotubes and the adhesive layer is greater than the bonding force between the top ends of the plurality of carbon nanotubes and the adhesive tape.

8. The method of claim 1, wherein during peeling off the cathode substrate, a peeling direction of the cathode substrate is perpendicular to the surface of the growth substrate.

9. The method of claim 1, further comprising a step of annealing the carbon nanotube array before step (S12) and after step (S11).

10. The method of claim 1, further comprising a step of plasma treating the top ends of the at least part of the plurality of carbon nanotubes after step (S16).

11. The method of claim 1, wherein the top ends of the at least part of the plurality of carbon nanotubes have a plurality of burrs.

12. A method for making field emitter comprising:
step (S21), providing a carbon nanotube array and a cathode substrate, wherein the carbon nanotube array is located on a substrate and comprises a plurality of carbon nanotubes, each of the plurality of carbon nanotubes comprises a root end in contact with the substrate and a top end away from the substrate; the cathode substrate comprises a base body and an adhesive layer formed on the base body;
step (S22), pressing the carbon nanotube array to make the plurality of carbon nanotubes toppled over on a surface of the substrate and form a carbon nanotube paper comprising the plurality of carbon nanotubes, wherein extending directions of the plurality of carbon nanotubes of the carbon nanotube paper become parallel to the surface of the substrate after pressing;
step (S23), placing the cathode substrate on the carbon nanotube paper, and the adhesive layer being in contact with the carbon nanotube paper;
step (S24), peeling off the cathode substrate, wherein at least part of the plurality of carbon nanotubes of the carbon nanotube paper are separated from the substrate and bonded to a surface of the adhesive layer, the at least part of the plurality of carbon nanotubes are perpendicular to the surface of the cathode substrate, and the top ends of the at least part of the plurality of carbon nanotubes are in contact with the adhesive layer; and
step (S25), curing the adhesive layer.

13. The method of claim 12, wherein the carbon nanotube array is fixed on the substrate by an adhesive, and a bonding force between the root ends of the plurality of carbon nanotubes and the adhesive is less than a bonding force between the top ends of the plurality of carbon nanotubes and the adhesive.

14. The method of claim 12, wherein the carbon nanotube array is a super-aligned carbon nanotube array, and the plurality of carbon nanotubes of the carbon nanotube array are substantially parallel to each other and perpendicular to the surface of the growth substrate.

15. The method of claim 12, wherein during peeling off the cathode substrate, a peeling direction of the cathode substrate is perpendicular to the surface of the substrate.

16. The method of claim 12, further comprising a step of annealing the carbon nanotube array before step (S22) and after step (S21).

17. The method of claim 12, further comprising a step of plasma treating the root ends of the at least part of the plurality of carbon nanotubes after step (S25).

18. The method of claim 12, wherein the root ends of the at least part of the plurality of carbon nanotubes have a plurality of burrs.

19. The method of claim 12, pressing the carbon nanotube array in one direction, wherein the plurality of carbon nanotubes of the carbon nanotube array are toppled over in one direction, and the plurality of carbon nanotubes of the carbon nanotube paper are aligned in one direction.

\* \* \* \* \*